(12) United States Patent
Chiselko et al.

(10) Patent No.: US 12,004,079 B2
(45) Date of Patent: *Jun. 4, 2024

(54) SYSTEM AND METHOD FOR RAN POWER AND ENVIRONMENTAL ORCHESTRATION

(71) Applicant: Verizon Patent and Licensing Inc., Basking Ridge, NJ (US)

(72) Inventors: Wayne A. Chiselko, Mullica Hill, NJ (US); Donna L Polehn, Mercer Island, WA (US); Mark T. Watts, Newport, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,664

(22) Filed: Jun. 13, 2022

(65) Prior Publication Data

US 2022/0322226 A1 Oct. 6, 2022

Related U.S. Application Data

(63) Continuation of application No. 17/032,047, filed on Sep. 25, 2020, now Pat. No. 11,395,222.

(51) Int. Cl.
*H04W 24/02* (2009.01)
*H04W 52/02* (2009.01)

(52) U.S. Cl.
CPC ....... *H04W 52/0203* (2013.01); *H04W 24/02* (2013.01)

(58) Field of Classification Search
CPC .............................. H04W 52/02; H04W 24/02
See application file for complete search history.

(56) References Cited

U.S. PATENT DOCUMENTS

| | | | |
|---|---|---|---|
| 9,848,338 B2 | 12/2017 | Randall et al. | |
| 10,499,456 B1* | 12/2019 | Branlund | H04B 7/0617 |
| 10,979,986 B1* | 4/2021 | Brisebois | H04W 52/343 |
| 2019/0141547 A1* | 5/2019 | Broustis | H04W 24/02 |
| 2020/0285523 A1* | 9/2020 | Guim Bernat | G06F 9/5044 |
| 2021/0076326 A1* | 3/2021 | Akl | H04W 52/0229 |
| 2021/0266907 A1* | 8/2021 | Cui | H04W 24/10 |

* cited by examiner

*Primary Examiner* — Michael T Vu (57) ABSTRACT

A power and environmental orchestration (P&EO) system uses network utilization condition information to implement scenarios that partially or fully reduce power requirements for radio access network (RAN) elements. A network device obtains power orchestration scenarios for a RAN and evaluates utilization data of multiple components of the RAN against the power orchestration scenarios. The network device determines that the utilization data meets a threshold for one of the power orchestration scenarios and applies the one of the power orchestration scenarios to reconfigure the RAN for reduced power consumption.

20 Claims, 10 Drawing Sheets

| Parameter | Threshold | Weighting Factor |
|---|---|---|
| Util % | T1 | WF1 |
| Conn. Users | T2 | WF2 |
| PRB Util | T3 | WF3 |
| TTI Util | T4 | WF4 |
| Throughput | T5 | WF5 |
| CQI RSSP | T6 | WF6 |
| TA Dist | T7 | WF7 |
| Mobility | T8 | WF8 |
| ⋮ | ⋮ | ⋮ |
| Other | Tr | WFr |

705 — Parameter column
710 — Threshold column
715 — Weighting Factor column
750 — rows

SYSTEM AND METHOD FOR RAN POWER AND ENVIRONMENTAL ORCHESTRATION

CROSS REFERENCE TO RELATED APPLICATION

This patent application is a continuation of U.S. patent application Ser. No. 17/032,047, entitled "System and Method for RAN Power and Environmental Orchestration" and filed on Sep. 25, 2020, the disclosure of which is incorporated herein by reference in its entirety.

BACKGROUND

Development and design of radio access networks (RANs) present certain challenges from a network-side perspective, including increased power consumption of RAN components. Typically, wireless cell sites, hubs, or other sites are completely turned on and consuming full power or they are completely down and consuming none.

DETAILED DESCRIPTION OF EXAMPLE EMBODIMENTS

The following detailed description refers to the accompanying drawings. The same reference numbers in different drawings may identify the same or similar elements. Also, the following detailed description does not limit the invention.

In current radio access networks (RANs), there is no way to gracefully reduce power consumption during times of lower load. Various proposed solutions generally entail a complete shutdown of some elements, but there is no coordinated way of orchestrating the various components involved. Under normal operating conditions under a standard power grid, optimizing power consumption by RAN resources can reduce overall energy consumption in a wireless network. When emergency backup power is being used (e.g., in the event of a power failure), it would be beneficial to provide optimized power consumption of RAN resources to ensure that wireless access remains available to users.

According to implementations described herein, a Power and Environmental Orchestration (P&EO) system may use various RAN and network utilization condition information, from power control and measurement elements, to implement scenarios that partially or fully reduce power and cooling based on controlled systems.

The P&EO system may be designed to work with a network function virtualization (NFV) environment and can run on a Virtualized Controller Platform (VCP). The P&EO system can ingest power usage information from various devices in the site such as RU's (Radio Units), blades running in the VCP itself, transport equipment, power and cooling equipment, etc. The P&EO system may also ingest utilization information from virtualized Base Band Units (vBBU), as well as other equipment.

Further, P&EO system may have functional control over RAN elements such that adjustments to their configurations can be actively implemented to reduce power loads based on certain power orchestration scenarios. For example, as the user load meets certain usage scenario thresholds, the scenario may be enacted to reduce the Effective Isotropic Radiated Power (EIRP) of a transmit antenna power, which in turn results in reduced power consumption. Some units can be completely turned off. The cooling can then be reduced to match the resulting reduction in generated heat.

Figure 1:
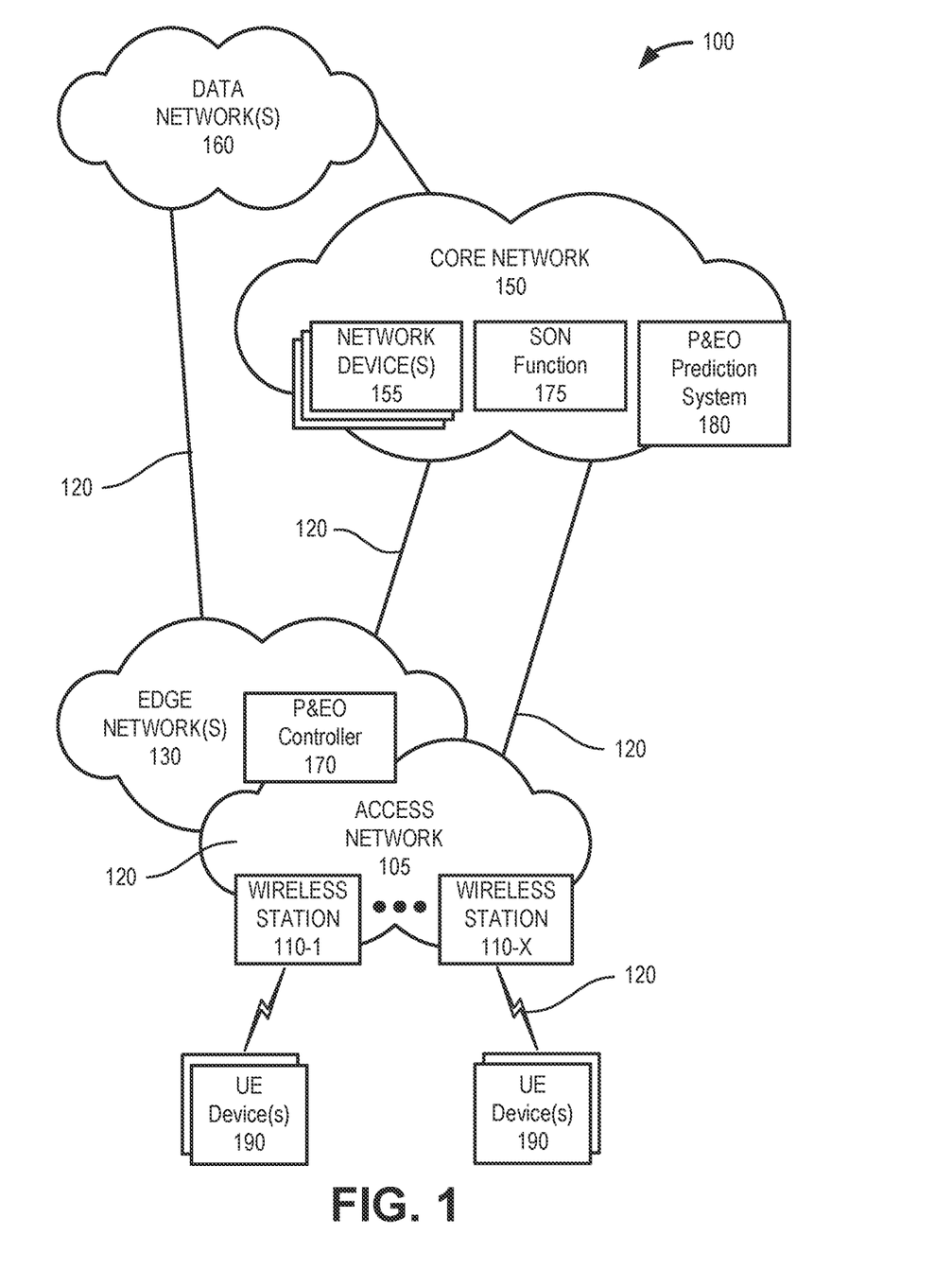
FIG. 1 illustrates an exemplary network environment in which a Power and Environmental Orchestration (P&EO) system described herein may be implemented.

FIG. 1 illustrates an exemplary environment 100 in which an embodiment of the P&EO system may be implemented. As illustrated, environment 100 includes an access network 105, one or more edge networks 130, a core network 150, and one or more data networks 160. Access network 105 may include wireless stations 110-1 through 110-X (referred to collectively as wireless stations 110 and generally as wireless station 110). Environment 100 further includes a P&EO controller 170, a Self-Organizing Network (SON) function 175, a P&EO prediction system 180, and one or more UE devices 190.

The number, the type, and the arrangement of network devices and the number of UE devices 190 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links 120 between the networks, between the network devices, and between UE devices 190 and the network devices. Environment 100 may be implemented to include wired, optical, and/or wireless communication links 120 among the network devices and the networks illustrated. A connection via a communication link 120 may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fifth Generation (5G) radio access network (RAN), Fourth Generation (4G) RAN, and/or another type of future generation RAN. By way of further example, access network 105 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 150.

Depending on the implementation, access network 105 may include one or multiple types of wireless stations 110. For example, wireless station 110 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 105 may be implemented according to various wireless technologies (e.g., radio access technology (RAT), etc.), wireless standards, wireless frequencies/bands, and so forth. According to an implementation, wireless stations 110 may include a gNB with multiple distributed components, such as a central unit (CU), a distributed unit (DU), a remote unit (RU or a remote radio unit (RRU)), or another type of distributed arrangement. As further discussed below, wireless stations 110 (as part of access network 105) may be part of a Self-Organizing Network (SON) that may be reconfigured by another component in networks 105, 130, and/or 150.

Each wireless station 110 typically uses multiple carrier frequencies in a single instance. For example, a single wireless station 110 may provide coverage over an area referred to as a cell. A cell typically uses multiple carrier frequencies to meet capacity demands and provide guaranteed service quality within each cell. It is not cost effective to deploy all carrier frequencies on every cell that a wireless carrier manages in a particular area. A cell may be divided into one or more sectors, with each sector providing different areas of coverage that may overlap. A particular sector may also transmit and/or receive signals on one or more predefined carrier frequencies. The combination of a sector and a particular carrier frequency may be referred to herein as a "sector carrier."

Edge network 130 includes a platform that provides application services at the edge of a network, such as services for the P&EO system described herein. For example, edge network 130 may be implemented as a Multi-access Edge Compute (MEC) platform. Edge network 130 may include network devices located to provide geographic proximity to various groups of wireless stations 110. In some embodiments, components of edge network 130 may be co-located with wireless stations 110 in RAN 105. In other embodiments, wireless stations 110 may connect to edge network 130 via wired (e.g., optical) backhaul links 120.

Edge network 130 may be implemented using one or multiple technologies including, for example, network function virtualization (NFV), software defined networking (SDN), cloud computing, or another type of network technology. Depending on the implementation, edge network 130 may include, for example, virtualized network functions (VNFs), multi-access (MA) applications/services, and/or servers. Edge network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

Core network 150 may include one or multiple networks of one or multiple network types and technologies. For example, core network 150 may be implemented to include a next generation core (NGC) network for a 5G network, an Evolved Packet Core (EPC) of an LTE network, an LTE-A network, an LTE-A Pro network, and/or a legacy core network. Depending on the implementation, core network 150 may include various network components and devices 155, such as for example, a user plane function (UPF), an access and mobility management function (AMF), a session management function (SMF), a unified data management (UDM) device or function, an authentication server function (AUSF), a network slice selection function (NSSF), network data analytics function (NWDAF), and so forth. For purposes of illustration and description, network devices 155 may include various types of network devices that may be resident in core network 150.

Core network 150 may manage communication sessions for UE devices 190. For example, core network 130 may establish an Internet Protocol (IP) connection between UE device 190 and a particular data network 160. Furthermore, core network 150 may enable UE device 190 to communicate with an application server or another type of network device 165 located in a particular data network 160 using a communication method that does not require the establishment of an IP connection between UE device 190 and data network 160, such as, for example, Data over Non-Access Stratum (DoNAS).

Data network 160 may include one or multiple networks. For example, data network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 160 may include various network devices that provide various applications, services, or other type of user device assets (e.g., servers (e.g., web, application, cloud, etc.), mass storage devices, data center devices), and/or other types of network services pertaining to various network-related functions.

P&EO controller 170 may include one or more network devices configured to implement the P&EO system. According to an implementation, P&EO controller 170 may monitor RAN utilization data and implement power orchestration scenarios during periods of low use to reduce/optimize power consumption by RAN components, while maintaining required levels of service. According to an implementation, P&EO controller 170 may be included at a network edge, such as within access network 105 or edge network 130. According to another implementation, P&EO controller 170 may select an edge resource, from the multiple edge networks 130 and or wireless stations 110, to provide requested power optimization services and may instruct the edge devices to perform container provisioning and service provisioning for the P&EO system. P&EO controller 170 is described further in connection with, for example, FIGS. 3-5.

As further shown, core network 150 may include a SON function 175. Depending on the embodiment, SON function 175 may be implemented as one or more network devices and/or software (e.g., a program). SON function 175 may include logic for modifying operating parameters of access network 105, including those of wireless stations 110. As further explained below, P&EO controller 170 may notify SON function 175 when thresholds (e.g., one or more indicators of RAN utilization levels) for a power orchestration scenario have been met. SON function 175 may determine an optimal solution for a reduced power use configuration (e.g. EIRP, up or down tilt, or other applicable parameters) for the given scenario. According to an implementation, SON function 175 may enact the reduced power use configuration by issuing commands to wireless stations 110 and/or other components in access network 105. In another implementation, SON function 175 may direct P&EO controller 170 to implement some or all of the configuration changes to enact the reduced power use configuration.

P&EO prediction system 180 may generate power orchestration scenarios 350 that can be used by P&EO controller 170 to detect and initiate reduced power use configurations for devices in access network 105. According to an implementation, P&EO prediction system 180 may ingest historical network data and apply machine learning to predict conditions when wireless stations 110 or other network elements can implement reduced power use configurations.

UE devices 190 may each include a mobile device, such as wireless or cellular telephone device (e.g., a conventional cell phone with data processing capabilities), a smart phone, a personal digital assistant (PDA) that can include a radiotelephone, etc. In another implementation, UE device 190 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UE devices 190 may be implemented as a machine-type communications (MTC) device, an Internet of Things (IoT) device, a machine-to-machine (M2M) device, etc., that includes communication functionality, such as a home appliance device, a home monitoring device, a camera, etc. UE devices 190 may connect to wireless stations 110 in a wireless manner.

Figure 2A:
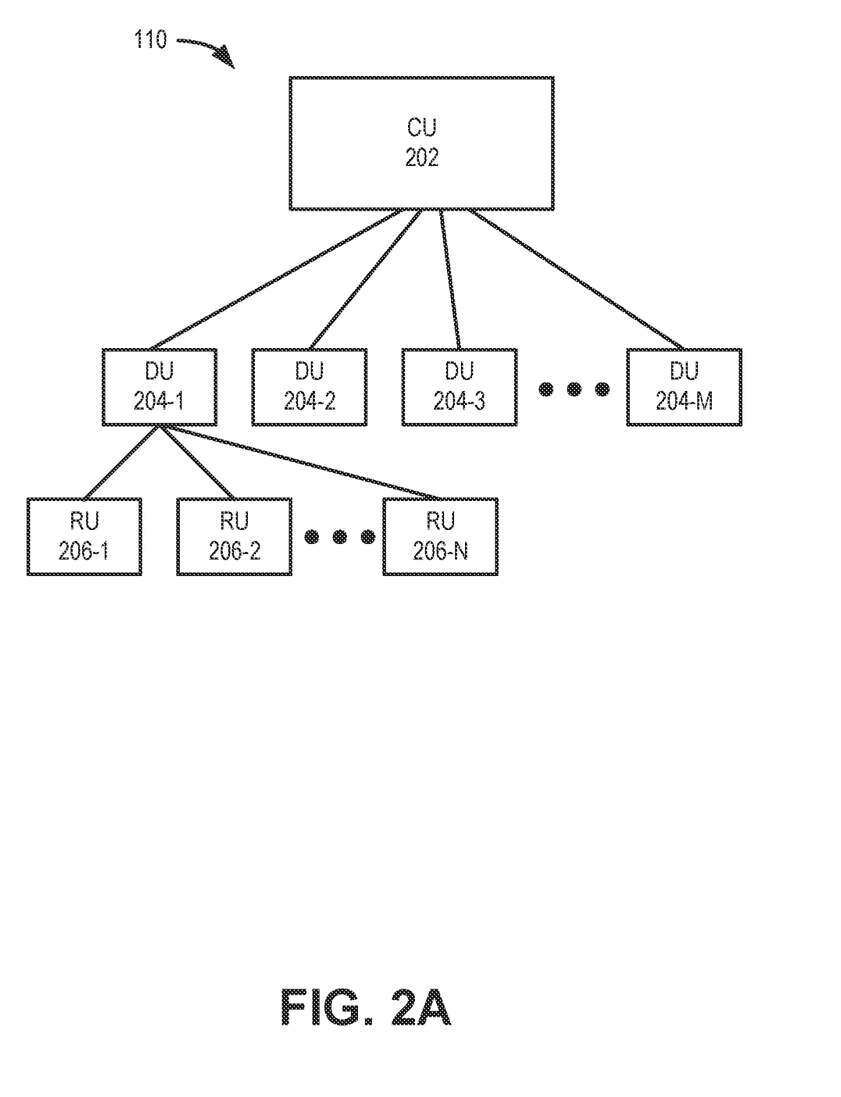
FIG. 2A illustrates exemplary logical components of the wireless stations of FIG. 1 according to one implementation.

FIG. 2A illustrates exemplary logical components of wireless stations 110 of FIG. 1 according to one implementation. Consistent with FIG. 1, wireless stations 110 is included in access network 105. Although access network 105 may include other wireless stations 110, they are not shown in FIG. 2A. Each of wireless station includes a central unit (CU) 202, distributed units (DUs) 204-1 through 204-M, and, for each DU 204, one or more Radio Units (RUs) 206-1 through 206-N. RU 206 may also be referred to as a remote radio head (RRH). For simplicity, other RUs are not shown in FIG. 2A.

CUs 202 may control DUs 204 over a front haul interface. CUs 202 may manage, for example, sharing access network 105, conveying user data, mobility, sessions, etc. For each CU 202, there may be multiple DUs 204 that the CU 202 controls.

CU 202 may process upper layers 402 of the communication protocol stack for wireless stations 110. CUs 202 may not necessarily be physically located near DUs 204, and may be implemented as cloud computing elements, through network function virtualization (NFV) capabilities of the cloud. In one implementation, CU 202 communicates with components of core network 150 through S 1/NG interfaces and with other CUs 202 through X2/XN interfaces.

DUs 204 may be controlled by CU 202. For each DU 204 in access network 150, there is only one CU 202. However, each DU 204 may send signals to multiple RUs 206 for transmission. DUs 204 may handle UE device mobility, from DU to DU, from a wireless station 110 to another wireless station 110, from a cell to another cell, from a beam to another beam, etc. DUs 204 communicate with a CU 202 through an F1 interface, and may process lower layers of a communication protocol stack for wireless station 110.

Figure 2B:
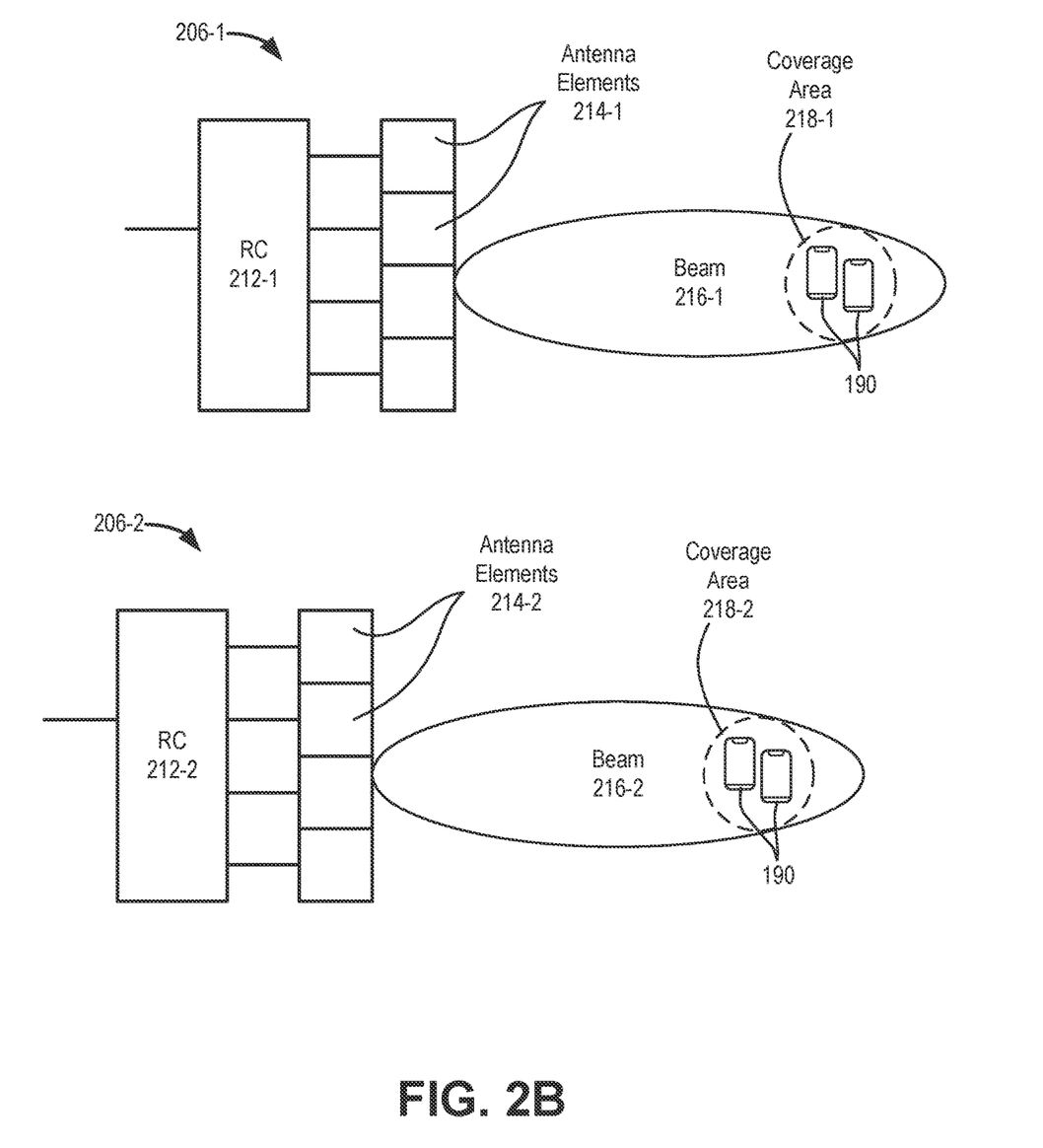
FIG. 2B illustrates exemplary logical components of the radio units of FIG. 2A according to one implementation.

FIG. 2B illustrates exemplary logical components of the RUs 206 of FIG. 2A according to one implementation. As shown, RU 206-1 may include radio circuit (RC) 212-1 and antenna elements 214-1. RU 206-2 may include radio circuit 212-2 and antenna elements 214-2. Depending on the implementation, RU 206-1 and RU 206-2 may include additional, fewer, different, or differently arranged components than those illustrated in FIG. 2B.

RC 212 may receive signals from DU 206, process them, and send them to antenna elements 214 for transmission. Antenna elements 214 may receive the signals and radiate the signals as a beam 216. In FIG. 2B, antenna elements 214-1 are shown as forming a beam 216-1 that reaches coverage area 218-1 and, and antenna elements 214-2 are shown as forming beam 216-2 that reach coverage area 218-2.

RUs 206 in FIG. 2B are capable of controlling beam shape, beam strength, and beam directions to balance traffic load over different bands. For example, assume that beam 216-1 and beam 216-2 cover the same area. DU 204 may set a minimum transmit power level at RU 206-1 for which UE devices in coverage area 218-1 may connect to wireless station 110 through beam 216-1. If SON function 175 instructs CU 202 and thus DU 204 to increase the minimum transmit power level for RU 206-1, the UE devices 102 in coverage area 218-1 may no longer remain connected to wireless station 110 via beam 216-1 (assuming that the signal strengths are the same). In the scenario, the UE devices 102 may then connect to wireless station 110 via beam 218-2 (which may occupy another frequency band), assuming that minimum transmit power level for the corresponding RU 206-2 remains the same. Accordingly, by lowering or raising the minimum transmit power level at DUs 204, SON function 175 may decrease or increase the traffic load at a particular band.

In another example, assume that beams 216-1 and 216-2 cover the same area (i.e., 218-1 and 218-2 are the same) and that beam 216-1 carries more traffic than beam 216-2 by y % (e.g., 15%). If beams 216-1 and 216-2 differ in direction by an angle X (e.g., 1 degree) beam 216-1 (which may be determined by comparing the portion of beam 216-1 with at least 3 DB power to the portion of beam 216-2 with at least 3 DB power), SON function 175 may instruct DU 204 (via CU 202) to tilt up beam 216-2, to better cover its area.

Figure 3:
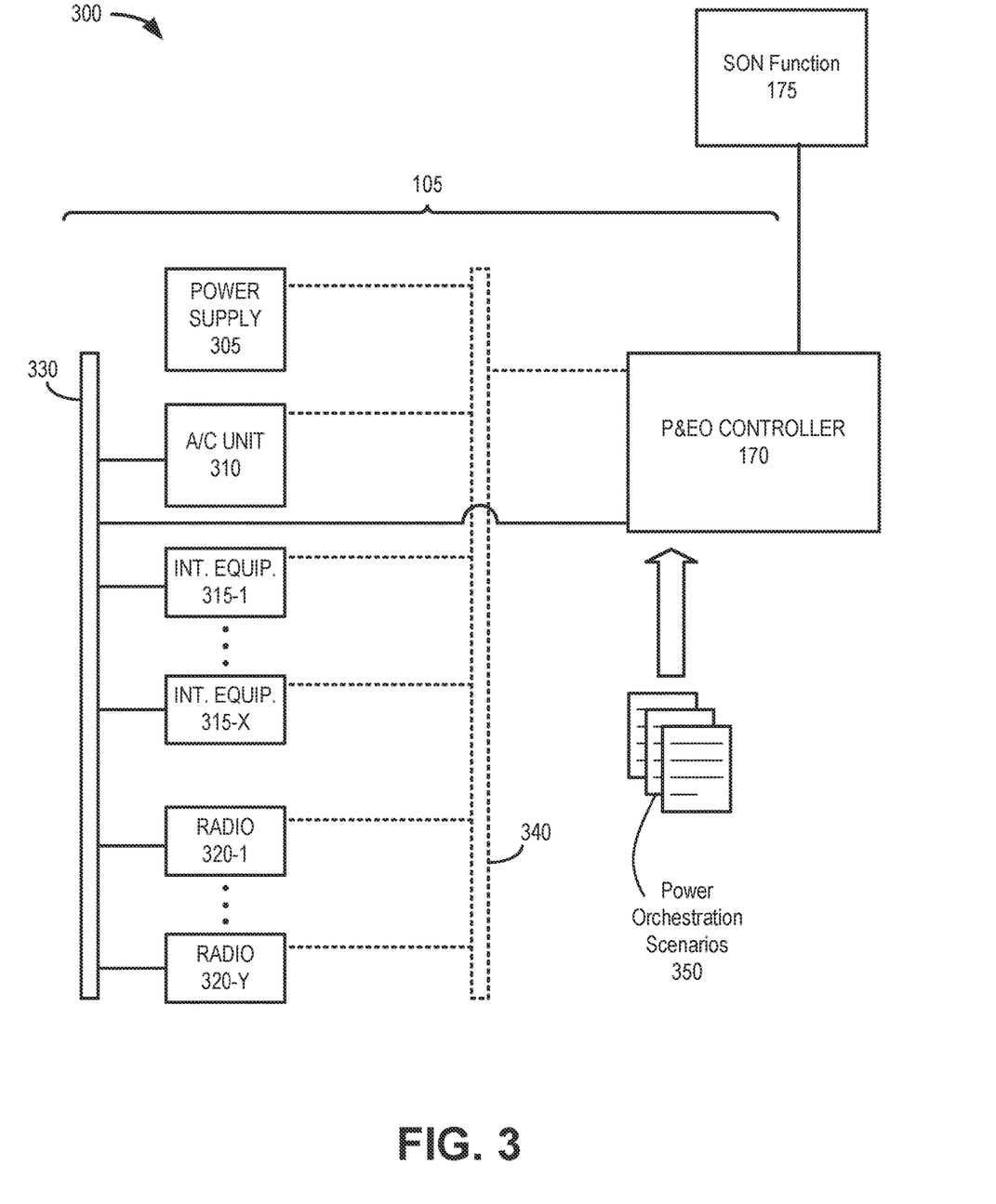
FIG. 3 is a block diagram illustrating an exemplary implementation of the P&EO system of in a portion of the network environment of FIG. 1.

FIG. 3 is a block diagram illustrating an exemplary implementation of the P&EO system of in a portion 300 of network environment 100. As shown in FIG. 3, network portion 300 may include P&EO controller 170, SON function 175, a power supply 305, one or more air conditioning (A/C) units 310, intermediate equipment 315-1 through 315-X (referred to collectively as "intermediate equipment 315"), radio equipment 320-1 through 320-Y (referred to collectively as "radios 320"), a power control bus 330, a data bus 340, and power orchestration scenarios 350.

Power supply 305 may include an emergency or permanent electrical power source for equipment associated with a wireless station 110 or another component of access network 105. For example, a permanent power supply may include a continuous alternating current (AC) power source. Alternatively, power supply 305 may include an emergency direct current (DC) power source, such as a generator or a battery that engages in the event of a power failure, for example.

A/C unit 310 may include an environmental cooling system for intermediate equipment 315 and/or radio equipment 320 in access network 105. A/C unit 310 may also include an environmental cooling system for systems impacted by changes to loads in wireless stations 110, such as backend systems in edge network 130 and/or core network 150.

Intermediate equipment 315 may include components such as routers and multiplexers within access network 105. Intermediate equipment 315 may correspond to access network equipment located between core network 150 and RU 206, for example. Radio equipment 320 may include one or more radio components of wireless station 110, such as RU 206.

Power control bus 330 may include a communications channel to allow P&EO controller 170 to adjust power levels to devices in access network 105 and/or other components in network portion 300.

Data bus 340 may include a message bus to exchange data between components in network portion 300. The data may include user demand and utilization data, as well as RAN and other data. The power utilization is also collected either from the equipment itself or from clamp on power meters (not shown), which may tie into data bus 340. Data bus 340 may support, for example, a publish-subscribe (pub-sub) model. In a data bus 340, such as a Pulsar bus or Kafka bus, a producer contributes a stream of records to one or more topics. A consumer subscribes to the one or more topics, and selectively retrieves records of subscribed topics for consumption. Data bus 340 may feed real-time open source remote procedure calls (e.g., gRPC), Simple Network Management Protocol (SNMP), or other data to P&EO controller 170.

Power orchestration scenarios 350 may include model for different access network 105 configurations that can be implemented to optimize network equipment utilization and power consumption for given customer use rates. For example, power orchestration scenarios 350 may identity times and/or usage thresholds where the number of active sector carriers can be reduced for certain wireless stations 110 while still providing required levels of service.

For example, assume the number of users served by a wireless station 110 with twelve sector carriers falls to a low level during an off-peak period. When at full power, assume the wireless station 110 consumes 15 kWh. Preferably, a power orchestration scenario 350 would permit the wireless station 110 to serve the active users during the off-peak period using only two sector carriers with significantly reduced power (e.g., 1 or 2 kWh) and a corresponding cooling adjustment. As described further herein, power orchestration scenarios 350 may be modeled and adapted by applying artificial intelligence and/or machine learning to historical network data, such as data collected via data bus 340.

Although FIG. 3 illustrates one arrangement of an environment 300 for a P&EO system, in other implementations, environment 300 may contain fewer components, different components, differently-arranged components, or additional components than depicted in FIG. 3. For example, in another implementation, a network data analytics function (NWDAF) or another core network component may provide additional network utilization data. Thus, communications described above in connection with FIG. 3 may use different communications interfaces to exchange data and provide power orchestration scenarios 350 than described above. Alternatively, or additionally, one or more components of environment 300 may perform one or more other tasks described as being performed by one or more other components of environment 300.

Figure 4:
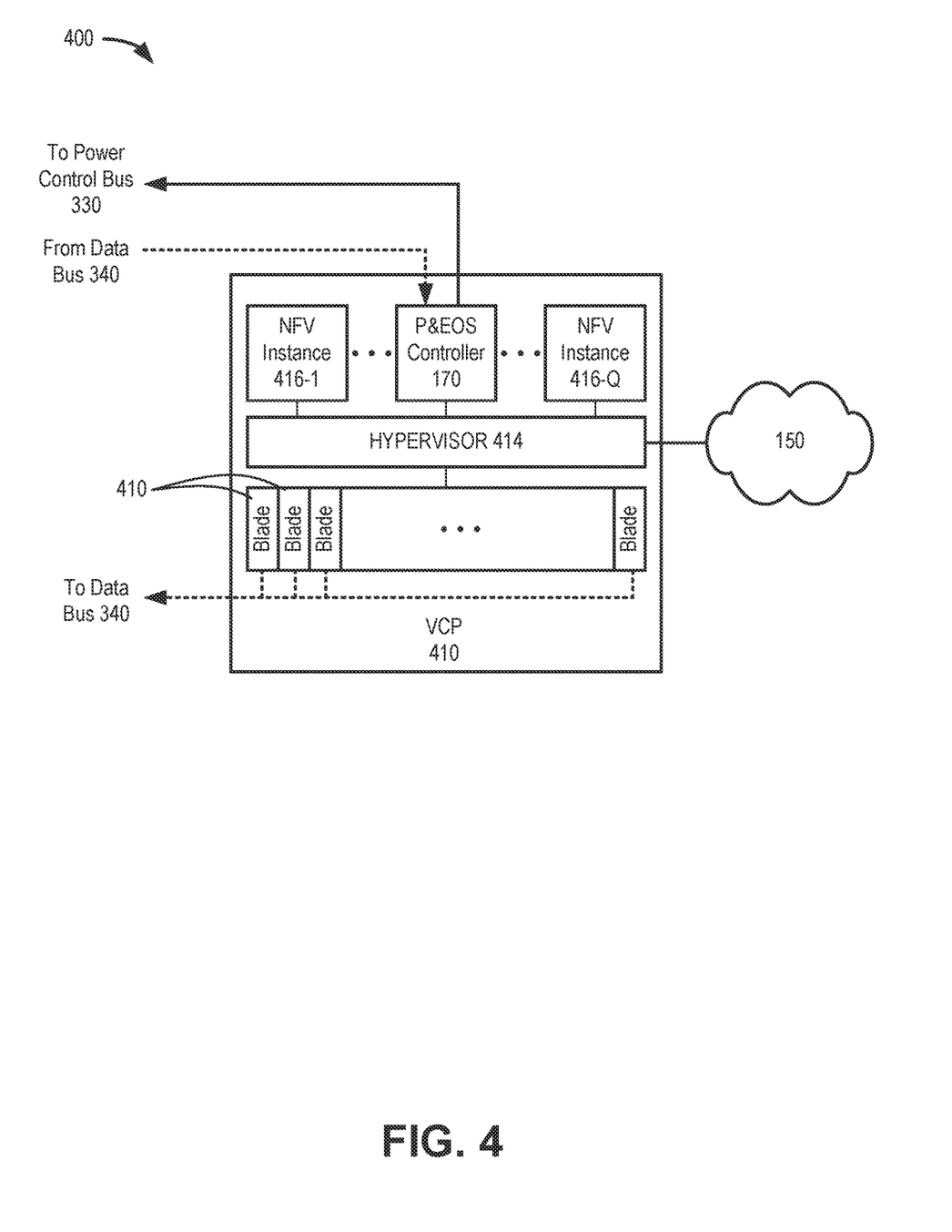
FIG. 4 is a block diagram illustrating an exemplary implementation of the P&EO system of in another portion of the network environment of FIG. 1.

FIG. 4 is a block diagram illustrating an exemplary implementation of the P&EO system of in a virtualization platform 400 of the network environment 100. As shown in FIG. 4, virtualization platform 400 may include a virtualized controller platform (VCP) 410. Components of VCP 410 may be included in core network 150 (e.g., network devices 155), an edge hub for access network 105, or edge network 130.

VCP 410 may include one or more physical computing resources, such a as processors, computer devices, etc., referred to as blades 412 in FIG. 4. Virtual network devices, referred to herein as network function virtualization (NFV) instances 416-1 through 416-Q, may be implemented on blades 412 under direction of a hypervisor 414 or another type of virtual machine monitor. In other implementations, NFV instances 416 may be implemented using one or multiple virtualization technologies, such as a hypervisor, a host, a container, a virtual machine (VM), a network function virtualization (NFV) infrastructure, a network function virtualization orchestrator (NFVO), a virtual network function manager (VNFM), a virtualized infrastructure manager (VIM), a platform manager and/or other types of virtualization elements (e.g., virtual network function (VNF), etc.), layers, hardware resources, operating systems, software resources, engines, etc.

According to an implementation, P&EO controller 170 may be implemented as one of NFV instances 416 within VCP 410. Other NFV instances 416 may control forwarding of packets via to/from access network 105. For example, NFV instances 416 may be configured to support network slices configured with different characteristics to support different types of applications and/or services, such as video streaming, massive Internet-of-Things (IoT) traffic, autonomous driving, etc. NFV instances 416 may also apply admission controls to direct wireless stations 110 and/or other network devices in backhaul links 120 to admit, block, delay or redirect a requesting UE device 190 depending on slice congestion levels and other factors. Thus, the usage and power consumption of blades 410 may be directly or indirectly related to the number of active NFV instances 416 executing on 410. Blades 410 may report power usage information to P&EO controller 170 via data bus 340, for example.

FIG. 4 illustrates exemplary components of virtualization platform 400. Depending on the implementation, virtualization platform 400 may include additional, fewer, different, or differently arranged components than those illustrated in FIG. 4.

Figure 5:
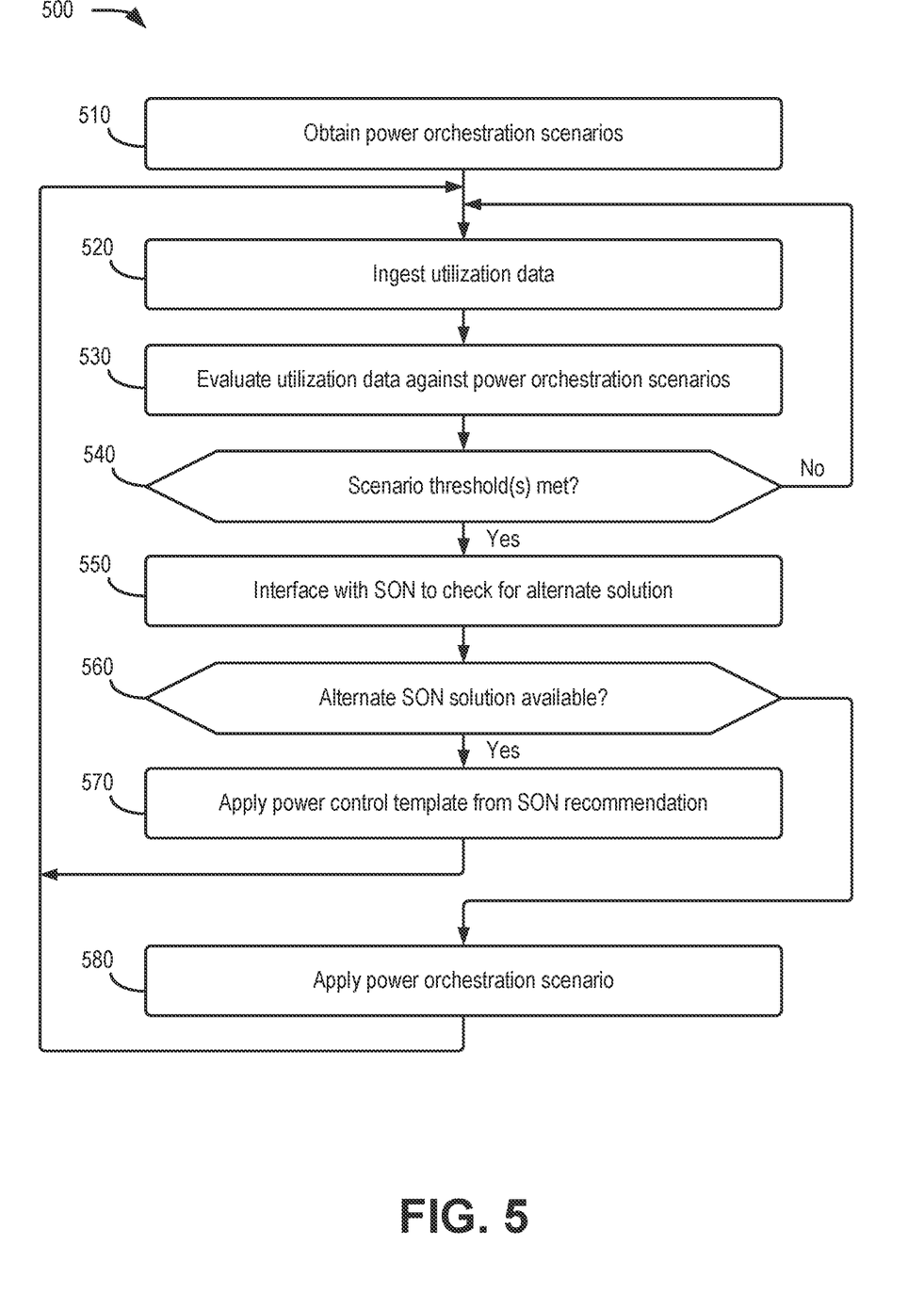
FIG. 5 is a flow diagram illustrating exemplary processes for optimizing power consumption in a radio access network, according to an implementation described herein.

FIG. 5 is a flow diagram illustrating exemplary processes 500 for optimizing power consumption in a radio access network. In one implementation, process 500 may be performed by P&EO controller 170. In another implementation, process 500 may be performed by P&EO controller 170 in conjunction with SON function 175 and/or another network device in network environment 100.

Process 500 may include obtaining power orchestration scenarios (block 510). For example, power orchestration scenarios 350 may be provided to P&EO controller 170 and/or generated by P&EO controller 170. The power orchestration scenarios may include triggering thresholds and network configurations to optimize power consumption for access network 105, particularly during periods of low utilization.

Process 500 may further include ingesting utilization data (block 520), evaluating the utilization data against the power orchestration scenarios (block 530), and determining if a power orchestration scenario is met (block 540). For example, P&EO controller 170 may receive utilization and power use information from devices (e.g., intermediate equipment 315, radio equipment 320, etc.) in access network 105 via data bus 340. P&EO controller 170 may identify thresholds from power orchestration scenarios 350 and determine if one or more thresholds are met in the collected utilization and power use information.

If a power orchestration scenario is not met (block 540-No), process 500 may return to process block 520 to continue to ingest utilization data. If a power orchestration scenario is met (block 540-Yes), process 500 may include interfacing with a SON function to check for an alternate solution (block 550) and determining if an alternate SON solution is available (block 560). For example, P&EO controller 170 may optionally interface with SON function 175 to confirm or change optimal reduced-power settings for access network 105. In one implementation, SON function 175 may verify that a particular power orchestration scenario 350 identified by P&EO controller 170 is suitable for implementation. In another implementation, SON function 175 may provide an alternative reduced-power configuration for access network 105 or override a power orchestration scenario to maintain full power.

If an alternate SON solution is available (block 560-Yes), process 500 may additionally include applying a power control template from the SON recommendation (block 570). For example, SON function 175 may provide control information to P&EO controller 170 as to what the optimal reduced power settings are for access network 105. Alternatively, SON function 175 may determine that other network factors may preclude implementation of reduced power settings.

If an alternate SON solution is not available (block 560-No), process 500 additionally include applying the power orchestration scenario (block 580). For example, P&EO controller 170 may determine that appropriate low-utilization thresholds are met for one or more wireless stations 110 in access network 105 and that SON function 175 has not supplied additional input (if applicable). P&EO controller 170 may then implement an appropriate power orchestration scenario 350 to optimize use of radio resources in wireless station 110 and reduce power consumption in access network 105. For example, a number of sector carriers for a wireless station 110 may be powered down while the power level of the remaining sector carriers may be increased and antenna down tilt increased to control interference to other sites. Alternatively, P&EO controller 170 may determine that utilization levels needs to increase above a threshold for one or more wireless stations 110 and that SON function 175 has not supplied additional input (if applicable). Accordingly, P&EO controller 170 may implement an appropriate power orchestration scenario 350 to increase use of radio resources in wireless station 110 to higher or full capacity.

Figure 6:
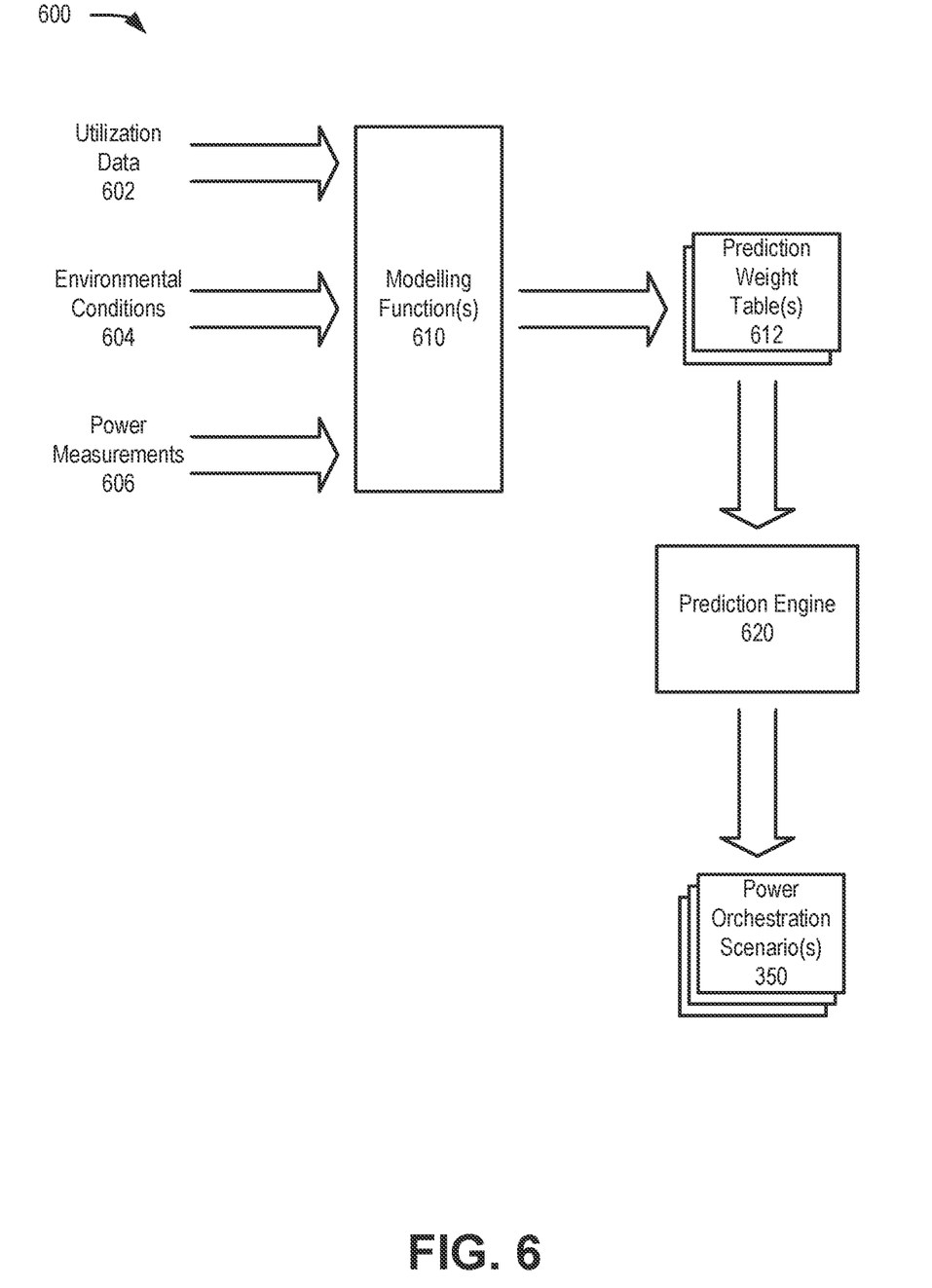
FIG. 6 is a diagram illustrating components of the P&EO prediction system of FIG. 1, according to an implementation described herein.

FIG. 6. is a diagram illustrating P&EO prediction system 180 for generating/updating power consumption models, according to an implementation described herein. System 180 may include one or more modeling functions 610 and a prediction engine 620. System 180 may be implemented, for example, in one or more network devices 155 of core network 150. In other implementations, system 180 may be implemented in one or more of edge networks 130 or in a distributed environment.

Modeling function 610 may receive utilization data 602, environmental conditions 604, and power measurements 606 from network sources. Utilization parameters 602, for example, may be collected by one or more Operations, Administration, and Maintenance (OAM) systems in network environment 100 (e.g., in access network 105 and/or core network 150) and stored in a database where modeling function 610 may access these data elements to estimate/predict low utilization periods for possible power level savings based on various parameters, such as those listed in connection with FIG. 7, as well as others that can be considered. For each wireless station 110, modeling function 610 may create a predictive utilization model, such as prediction weight table 612, that predicts the power savings vs. network performance cost trade off.

Figure 7:
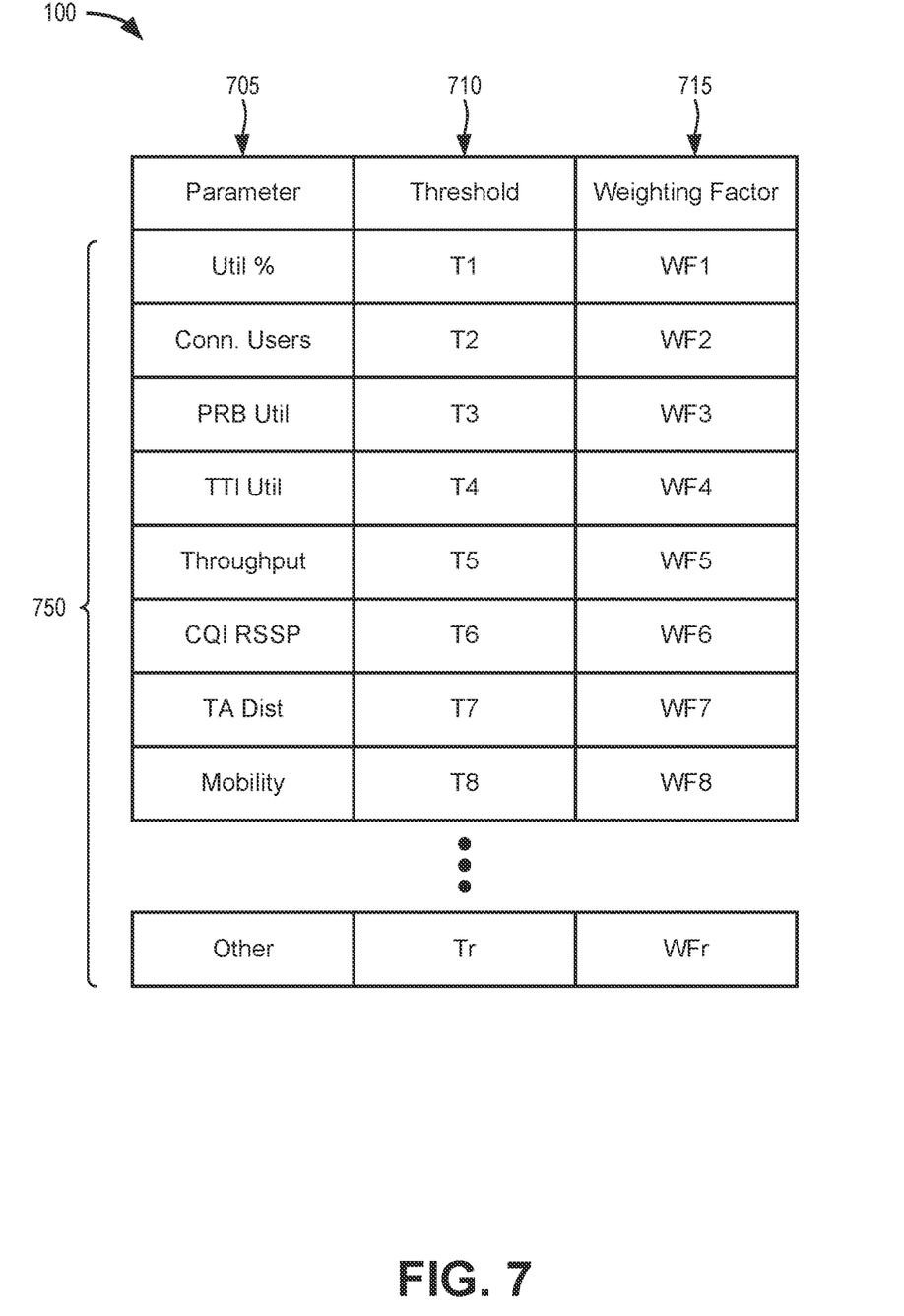
FIG. 7 is an illustration of an exemplary prediction table for the P&EO prediction system as described herein.

FIG. 7 provides a diagram illustrating a portion of a prediction weight table 612 for a power orchestration scenario. Referring to FIG. 7, prediction weight table 612 may include one or more parameter identifier fields 705, one or more threshold fields 710, one or more weight factor fields 715, and a variety of entries 750 associated with each of fields 705-715. In table 700, each set of rows may correspond to a separate threshold input parameter. In one implementation, thresholds may apply to the resource usage and performance of each respective wireless station 110. That is, each wireless station 110 (or another network element) may have a table 700 that is fed into the prediction engine 620.

Parameter identifier field 705 may include one or more measurable indicators of a wireless station 110 that may have an impact on network power consumption. Parameter identifier field 705 may include one or two or more features in combination, that may be indicative of particular network conditions where power consumption can be reduced. Features may include, for example, a utilization percentage, a number of connected users (e.g., a number of radio resource control (RRC) connections,), a physical resource block (PRB) utilization level, a transition time interval (TTI) utilization, a throughput level (e.g., burst user throughput), Channel Quality Indicator (CQI) Received Signal Strength Indication (RSSI) value, Timing Advance (TA) distance, mobility, etc. Each data element in parameter identifier field 705 maps to a particular threshold in threshold field 710, which is mapped to power savings weighting factor in weight factor field 715.

Threshold field 710 may include one or more thresholds for features in corresponding parameter identifier fields 705. Threshold field 710 may include a numerical value, a percentage value, or another type of value that may indicate, for example, that a wireless station may be experiencing low utilization.

Weight factor field 715 may include a weight factor for elements in corresponding parameter identifier fields 705. The weight factor may be indicative of the potential power savings associated with corresponding element. The weight values in weight factor field 715 may have an initial estimate but can be changed over time as various conditions or results vary depending on the specific user patterns or other unique factors for a specific wireless station 110. Further, the feedback from SON function 175 may alter thresholds dynamically as well. This approach can be used to refine scenarios over time as actual realized power savings vs. network performance results. Utilization in some scenarios may be cyclical (i.e., time of day, commuter vs. work-at-home traffic, etc.). Thus required power levels can be predictable.

Although FIG. 7 shows exemplary information that may be provided in prediction model 612 for a wireless station 110, in other implementations, prediction model 612 may contain less, different, differently-arranged, or additional information than depicted in FIG. 7. For example, fields in prediction model 612 may be broken down by sector carrier and include time of day and other external data. Also, prediction model 612 may be replaced with a flat file structure with strings of features and settings in place of designated fields.

Returning to FIG. 6, prediction engine 620 may receive prediction models 612 and may create power orchestration scenarios 350 based on the prediction models 612. For example, prediction engine 620 may determine combinations of wireless stations 110 that can support predicted conditions with lower-than-normal power for given periods. Prediction engine 620 may identify, for example, different combinations of sector carriers at different wireless stations that can be used to provide a low-power consumption scenario for periods of low RAN utilization. According to an implementation, prediction engine 620 may apply artificial intelligence to provide initial estimates based on training data and provide updates as historical data is added to the data set. Power orchestration scenarios 350 may be provided to P&EO controller 170 for implementation, as described above in connection with FIG. 3, for example.

Figure 8:
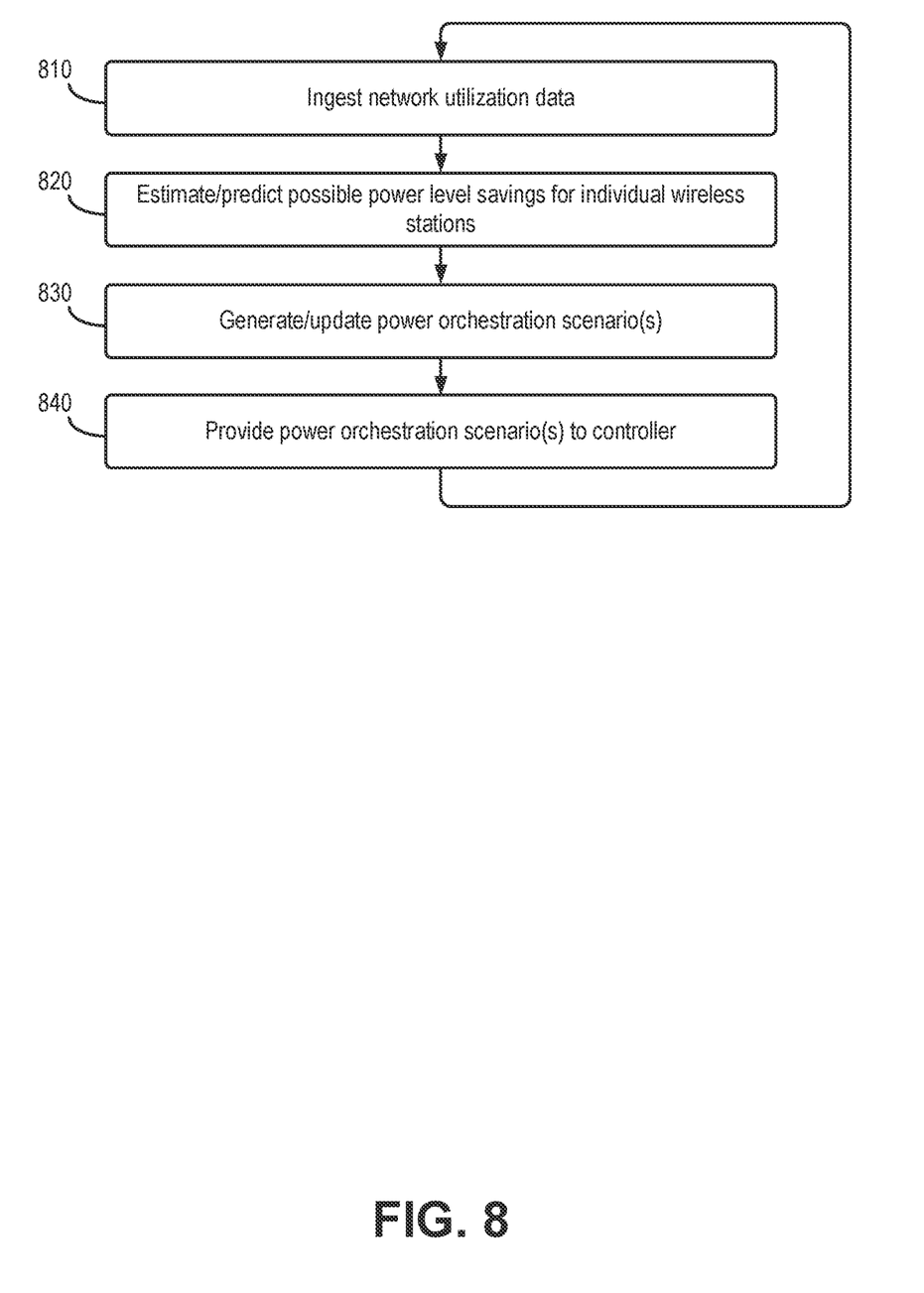
FIG. 8 is a flow diagram illustrating an exemplary process for generating power orchestration scenarios, according to an implementation described herein.

FIG. 8 is a flow diagram illustrating an exemplary process 800 for generating a power orchestration scenario the P&EO system. In one implementation, process 800 may be performed by prediction system 180. In another implementation, process 800 may be performed by P&EO prediction system 180 in conjunction with one or more other network devices in network environment 100, such as P&EO controller 170 and/or SON function 175.

Process 800 may include ingesting network utilization data (block 810), and estimating possible power level savings (block 820). For example, modeling function 610 of P&EO prediction system 180 may receive RAN utilization data and other data from network elements. In one implementation, various network utilization data may be collected via OAM systems that feed a local database accessible by modeling function 610. In one aspect, modeling function 610 may normalize the data, remove outliers, etc. Using different artificial intelligence and machine learning processes, for example, modeling function 610 may access the stored data elements to estimate and/or predict possible power level savings based on the various parameters. According to an implementation, modeling function 610 may generate a prediction weight table 612 for each wireless station 110.

Process 800 may further include generating a power orchestration scenario (block 830), and providing the power orchestration scenario to a controller (block 840). For example, prediction engine 620 may receive prediction models 612 from modeling function 610 and may create power orchestration scenarios 350 based on the prediction models 612. Prediction engine 620 may forward the power orchestration scenarios 350 to P&EO controller 170 for implementation. Additionally, as new network utilization data is provided, modeling function 610 may provide updated prediction models 612, which in turn may be used by prediction engine 620 to updated power orchestration scenarios 350.

Figure 9:
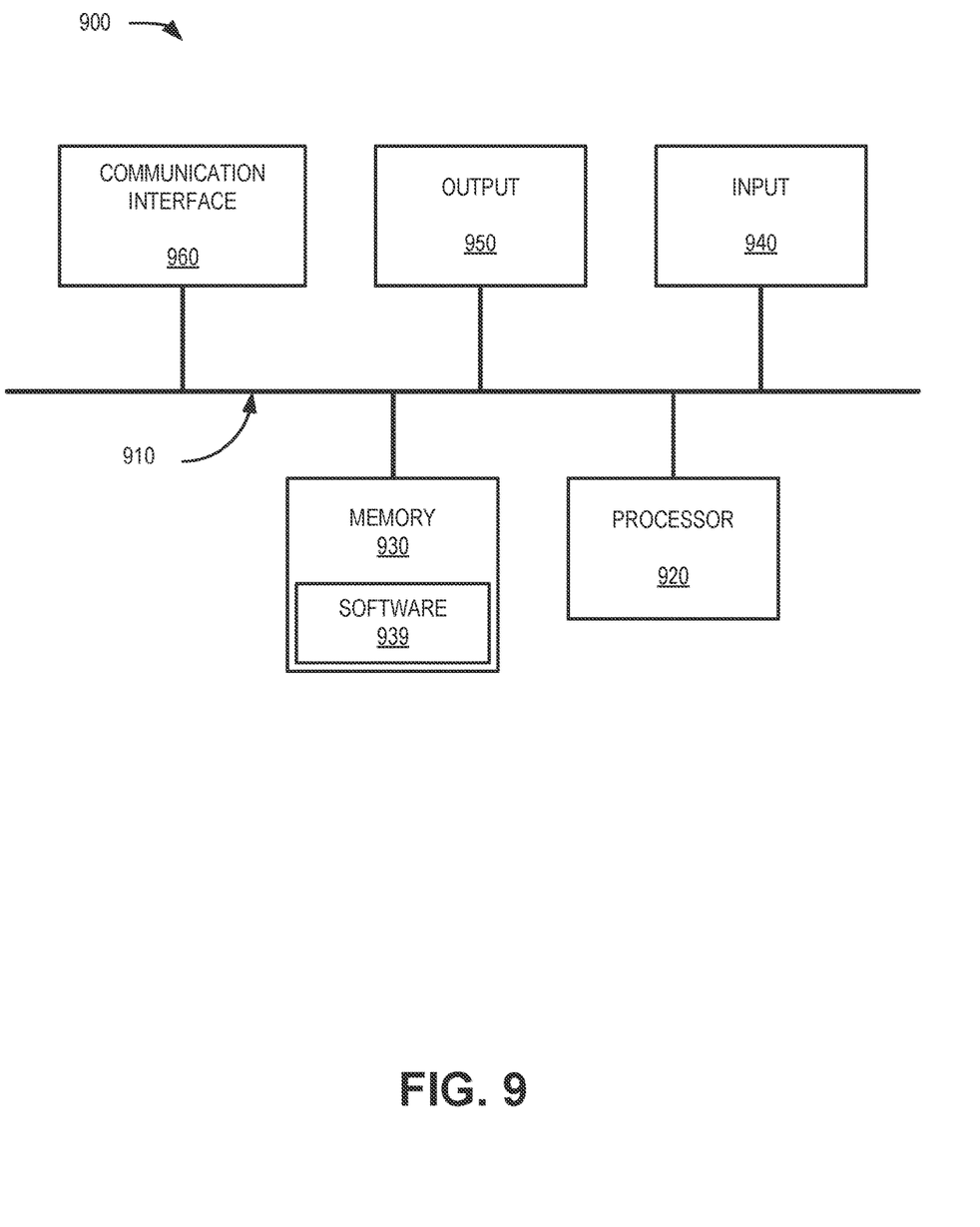
FIG. 9 is a block diagram illustrating exemplary components of a device that may correspond to one of the devices described herein.

FIG. 9 is a block diagram illustrating exemplary components of a device that may correspond to one of the devices of FIGS. 1-8. Each of wireless station 110, network devices 155, P&EO controller 170, SON function 175, P&EO prediction system 180, end device 190, and VCP 410 may be implemented as a combination of hardware and software on one or more of devices 900. As shown in FIG. 9, device 900 may include a bus 910, a processor 920, a memory 930 with software 935, an input device 940, an output device 950, and a communication interface 960.

Communication channel 910 may include a path that permits communication among the components of device 900. Processor 920 may include a processor, a microprocessor, or processing logic that may interpret and execute instructions. Memory 930 may include any type of dynamic storage device that may store information and instructions, for execution by processor 920, and/or any type of non-volatile storage device that may store information for use by processor 920.

Software 935 includes an application or a program that provides a function and/or a process. Software 935 is also intended to include firmware, middleware, microcode, hardware description language (HDL), and/or other form of instruction. By way of example, when device 900 is an P&EO controller 170, software 935 may include power orchestration scenarios 350, as described herein.

Input device 940 may include a mechanism that permits a user to input information to device 900, such as a keyboard, a keypad, a button, a switch, touch screen, etc. Output device 950 may include a mechanism that outputs information to the user, such as a display, a speaker, one or more light emitting diodes (LEDs), etc.

Communication interface 960 may include a transceiver that enables device 900 to communicate with other devices and/or systems via wireless communications, wired communications, or a combination of wireless and wired communications. For example, communication interface 960 may include mechanisms for communicating with another device or system via a network. Communication interface 960 may include an antenna assembly for transmission and/or reception of RF signals. For example, communication interface 960 may include one or more antennas to transmit and/or receive RF signals over the air. In one implementation, for example, communication interface 960 may communicate with a network and/or devices connected to a network. Alternatively or additionally, communication interface 960 may be a logical component that includes input and output ports, input and output systems, and/or other input and output components that facilitate the transmission of data to other devices.

Device 900 may perform certain operations in response to processor 920 executing software instructions (e.g., software 935) contained in a computer-readable medium, such as memory 930. A computer-readable medium may be defined as a non-transitory memory device. A non-transitory memory device may include memory space within a single physical memory device or spread across multiple physical memory devices. The software instructions may be read into memory 930 from another computer-readable medium or from another device. The software instructions contained in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

Device 900 may include fewer components, additional components, different components, and/or differently arranged components than those illustrated in FIG. 9. As an example, in some implementations, a display may not be included in device 900. As another example, device 900 may include one or more switch fabrics instead of, or in addition to, bus 910. Additionally, or alternatively, one or more components of device 900 may perform one or more tasks described as being performed by one or more other components of device 900.

Systems and methods described herein provide a power and environmental orchestration (P&EO) system that uses network utilization condition information to implement scenarios that partially or fully reduce power requirements for radio access network (RAN) elements. A network device obtains power orchestration scenarios for a RAN and evaluates utilization data of multiple components of the RAN against the power orchestration scenarios. The network device determines that the utilization data meets a threshold for one of the power orchestration scenarios and applies the one of the power orchestration scenarios to reconfigure the RAN for reduced power consumption.

The P&EO system described herein provides the ability to measure, predict, and control power consumption based on user demand for predicted performance, which can reduce the cost of power use and also plant costs. The P&EO system may also allow networks to adapt to known power constraints, such as scheduled outages, brownouts, etc. In a power failure scenario, the P&EO system described herein also may apply reduced performance criteria to maximize battery and generator capacity until a service restoration. Additionally, the P&EO system may allow certain types of traffic, such as IoT with low bandwidth, to be moved to a lower power band (such as 700 MHz) if demand is low, since the power needed for higher bands (such as millimeter-wave bands) can be reserved for higher bandwidth applications.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5 and 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 920, etc.), or a combination of hardware and software (e.g., software 935).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 920) of a device. A non-transitory storage medium includes one or more of the storage mediums described in relation to memory 930.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method, comprising:
generating, by a network device, a predictive utilization model for a radio access network (RAN), wherein the predictive model includes parameters of wireless stations that impact network power consumption;
assigning, by the network device, to each of the parameters a weight factor indicative of potential power savings associated with the parameter;
generating, by the network device, power orchestration scenarios based on the predictive utilization model and the weight factors, wherein the power orchestration scenarios identify combinations of sector carriers for the wireless stations that can support the predicted conditions with reduced energy consumption when one or more of the parameters meet one or more thresholds for the parameters;
storing, by the network device, the power orchestration scenarios;
determining, by the network device and based on real-time utilization data of the RAN, a time to implement one of the power orchestration scenarios; and
reconfiguring, by the network device, the RAN at the time based on the one of the power orchestration scenarios.

2. The method of claim 1, further comprising:
evaluating, by the network device, utilization data of multiple components of the RAN.

3. The method of claim 1, wherein one or more of the power orchestration scenarios are based on user patterns for a wireless station of the RAN.

4. The method of claim 1, wherein determining the time to implement one of the power orchestration scenarios, comprises:
comparing a power utilization level of a wireless station to a power utilization threshold.

5. The method of claim 1, further comprising:
verifying, by a self-organizing network (SON) function, that the one of the power orchestration scenarios is suitable for implementation.

6. The method of claim 1, further comprising:
ingesting historical utilization data of multiple components of the RAN; and
generating, based on the historical utilization data, the predictive utilization model for the RAN.

7. The method of claim 6, further comprising:
ingesting real-time utilization data; and
updating, based on historical utilization data and the real-time utilization data, the predictive utilization model.

8. The method of claim 7, wherein the real-time utilization data includes power supply data for a generator or back-up battery.

9. The method of claim 1, wherein the reconfiguring reduces an Effective Isotropic Radiated Power (EIRP) of a transmit antenna in the RAN.

10. The method of claim 1, wherein the network device is included within a virtualized controller platform in one of:
an edge hub for the RAN; or
a multi-access edge computing (MEC) network.

11. A network device in an application service layer network, the network device comprising:
a processor configured to:
generate a predictive utilization model for a radio access network (RAN), wherein the predictive model includes parameters of wireless stations that impact network power consumption;
assign to each of the parameters a weight factor indicative of potential power savings associated with the parameter;
generate power orchestration scenarios based on the predictive utilization model and the weight factors, wherein the power orchestration scenarios identify combinations of sector carriers for the wireless stations that can support the predicted conditions with reduced energy consumption when one or more of the parameters meet one or more thresholds for the parameters;
store the power orchestration scenarios;
determine, based on real-time utilization data of the RAN, a time to implement one of the power orchestration scenarios; and
initiate reconfiguring the RAN at the time based on the one of the power orchestration scenarios.

12. The network device of claim 11, wherein the processor is further configured to:
evaluate utilization data of multiple components of the RAN.

13. The network device of claim 11, wherein one or more of the power orchestration scenarios are based on user patterns for a wireless station of the RAN.

14. The network device of claim 11, wherein, when determining the time to implement one of the power orchestration scenarios, the processor is further configured to:
compare a power utilization level of a wireless station to a power utilization threshold.

15. The network device of claim 11, wherein the processor is further configured to:
receive verification of the one of the power orchestration scenarios from a self-organizing network (SON) function.

16. The network device of claim 11, wherein the processor is further configured to:
ingest historical utilization data of multiple components of the RAN; and
generate, based on the historical utilization data, the predictive utilization model for the RAN.

17. The network device of claim 11, wherein the processor is further configured to:
retrieve utilization data of multiple components of the RAN via a message bus in real-time.

18. A non-transitory computer-readable storage medium storing instructions executable by a processor of a device, which when executed cause the device to:
generate a predictive utilization model for a radio access network (RAN), wherein the predictive model includes parameters of wireless stations that impact network power consumption;
assign to each of the parameters a weight factor indicative of potential power savings associated with the parameter;
generate power orchestration scenarios based on the predictive utilization model and the weight factors, wherein the power orchestration scenarios identify combinations of sector carriers for the wireless stations that can support the predicted conditions with reduced energy consumption when one or more of the parameters meet one or more thresholds for the parameters;
store the power orchestration scenarios;
determine, based on real-time utilization data of the RAN, a time to implement one of the power orchestration scenarios; and initiate reconfiguring the RAN at the time based on the one of the power orchestration scenarios.

19. The non-transitory computer-readable storage medium of claim 18, further comprising instructions to:
evaluate utilization data of multiple components of the RAN.

20. The non-transitory computer-readable storage medium of claim 18, further comprising instructions to:
receive verification of the one of the power orchestration scenarios from a self-organizing network (SON) function.

\* \* \* \* \*